United States Patent [19]

Paranjpe

[11] 4,031,561

[45] June 21, 1977

[54] STARTUP APPARATUS AND METHOD FOR JET DROP RECORDING WITH RELATIVELY MOVABLE CHARGE PLATE AND ORIFICE PLATE

[75] Inventor: Suresh C. Paranjpe, Xenia, Ohio

[73] Assignee: The Mead Corporation, Dayton, Ohio

[22] Filed: May 3, 1976

[21] Appl. No.: 682,363

[52] U.S. Cl. .................................... 346/1; 346/75

[51] Int. Cl.[2] .................................... G01D 15/18

[58] Field of Search .............................. 346/1, 75

[56] References Cited

UNITED STATES PATENTS

| | | | |
|---|---|---|---|
| 3,346,869 | 10/1967 | Stone | 346/75 |
| 3,647,138 | 3/1972 | Houser | 346/75 X |
| 3,661,304 | 5/1972 | Martinez et al. | 346/75 X |
| 3,805,273 | 4/1974 | Brady et al. | 346/75 |
| 3,839,721 | 10/1974 | Chen et al. | 346/75 |
| 3,891,121 | 6/1975 | Stoneburner | 346/75 X |
| 3,970,222 | 7/1976 | Duffield | 346/75 X |

*Primary Examiner*—George H. Miller, Jr.

*Attorney, Agent, or Firm*—Biebel, French & Nauman

[57] ABSTRACT

A jet drop recording head of laminar construction is started up by moving the charge plate thereof into contact or near contact with the orifice plate prior to introduction of recording liquid into the head. After this position is achieved, a flush fluid is pumped into the head, and this pumping is continued as the head fills and fluid pushes through the orifice plate and charge plate to form free standing jets. Once the jets are formed the flush fluid is replaced by recording liquid, and the charge plate is moved away from the orifice plate to a normal operating position. Prior to such separation the lower surface of the charge plate is cleared of collected flush fluid by blowing a stream of air thereacross or by tilting the entire head to enable runoff. A non-wettable coating on the lower surface of the charge plate facilitates such clearing of collected flush fluid.

22 Claims, 7 Drawing Figures

STARTUP APPARATUS AND METHOD FOR JET DROP RECORDING WITH RELATIVELY MOVABLE CHARGE PLATE AND ORIFICE PLATE

BACKGROUND OF THE INVENTION

This invention relates to jet drop recorders of the general type disclosed in Beam U.S. Pat. No. 3,577,198 and in Mathis U.S. Pat. No. 3,701,998. Such jet drop recorders comprise a series of electrical and fluidic components, including an orifice plate and a charge plate arranged in laminar relationship for generating one or more rows of jets and selectively charging drops originating therefrom. Typically there may be about 250 or more jets formed in each such row, and each jet is stimulated to produce drops at a rate of about 40 kilohertz. All such drops fall through an electrical deflection field, and those which are charged are deflected into a catcher. Uncharged drops deposit on a moving web transported below the recording head.

One of the most difficult problems in the operation of such jet drop recorders is that of achieving satisfactory startup. When ink or other recording liquid is pumped into an initially empty recording head, the jets do not begin flowing freely but rather tend to blob and run together. This wets the top surface of the charge plate, including electrical lead lines plated thereon and ring-type charging electrodes connected thereto. Once such wetting has occurred, it is impossible to perform satisfactory drop charging, and any attempt at normal operation can result in burning out of the lead lines and the charging electrodes. Also liquid on top of the charge plate may effect jet straightness. Thus in early designs it was necessary to follow the startup step with a difficult cleaning step, which was conducted with the jets running. After cleanup the system was ready for recording.

One of the first solutions to the startup problem involved an impulse technique as taught by Martinez et al U.S. Pat. No. 3,661,304. In this startup method a fluid shock wave forces ink through a jet forming orifice at high energy. This method avoids blobbing at the exit side of the orifice and is fairly satisfactory for starting up a single jet. However, the technique has not been found satisfactory for starting up large number of jets.

A startup method which has been found to be satisfactory for starting up a large number of jets is taught in Stoneburner U.S. Pat. No. 3,891,121. In accordance with that invention a source of pressurized air is connected to the recording head, and high pressure air is pumped into the head prior to the admission of ink. Once a flow of pressurized air has been established through the jet forming orifices, then ink is pumped into the recording head. When the ink follows the pressurized air in this manner, the jets start up cleanly without any wetting of charging electrodes. Another somewhat related startup method is taught in Duffield U.S. Pat. No. 3,970,222.

As further taught by the Stoneburner patent, startup may be improved by pumping a flush fluid through the recording head after the flow of pressurized air has commenced and before admission of ink. The flush fluid forms free flowing jets, and after these jets have been established the flush fluid is replaced with the ink.

Still another startup method involves usage of a charge plate having charging electrodes plated inside a series of notches. Because of the configuration of the electrodes it is possible to move the charge plate sidewardly away from the jets during the startup process. This keeps the charging electrodes clean, but does not prevent collection of ink on the lower surface of the orifice plate. Ink so collected may drip onto the charge plate once it has been moved into the operating position.

Other prior art relating to startup includes Stone U.S. Pat. No. 3,346,869, which shows a nozzle cover, and Chen et al U.S. Pat. No. 3,839,721, which shows a vapor chamber to prevent collection of dried ink during shutdown of a recording head.

SUMMARY OF THE INVENTION

This invention prevents accumulation of liquid between the charge plate and the orifice plate of a jet drop recording head by moving the two plates into contact or near contact during the startup sequence. Relatively little liquid collects on the lower surface of the charge plate, and such collected liquid may be removed by introduction of a liquid drying air flow or by tilting of the head for gravity induced runoff. Wetting of the lower surface of charge plate may be minimized and cleanup facilitated by coating the lower surface of the charge plate with a non-wettable coating.

Further in accordance with this invention the charge plate and orifice plate are separated and positioned into normal operating relationship after startup has been achieved. The separation distance between the plates during operation may be in the order of about 0.25 millimeters or more, but for startup the distance preferably is less than about 0.05 millimeters.

For a recording head constructed in accordance with this invention the orifice plate and liquid supply components may be mounted in a fixed position, with the charge plate moveable vertically relative thereto. There may be provided a carrier plate at the top of the recording head, and the carrier plate may be connected for producing the above mentioned vertical motion of the charging plate.

It is therefore seen that it is an object of this invention to provide apparatus and method for improved startup of a jet drop recorder.

It is another object of this invention to provide apparatus and method for cleaning collected liquid from the surface of a charge plate.

Still another object of the invention is to provide apparatus for effecting relative movement between a charge plate and an orifice plate.

Other and further objects of this invention will be apparent from the following description, the accompanying drawings and the appended claims.

DESCRIPTION OF THE PREFERRED EMBODIMENTS

Figure 1:
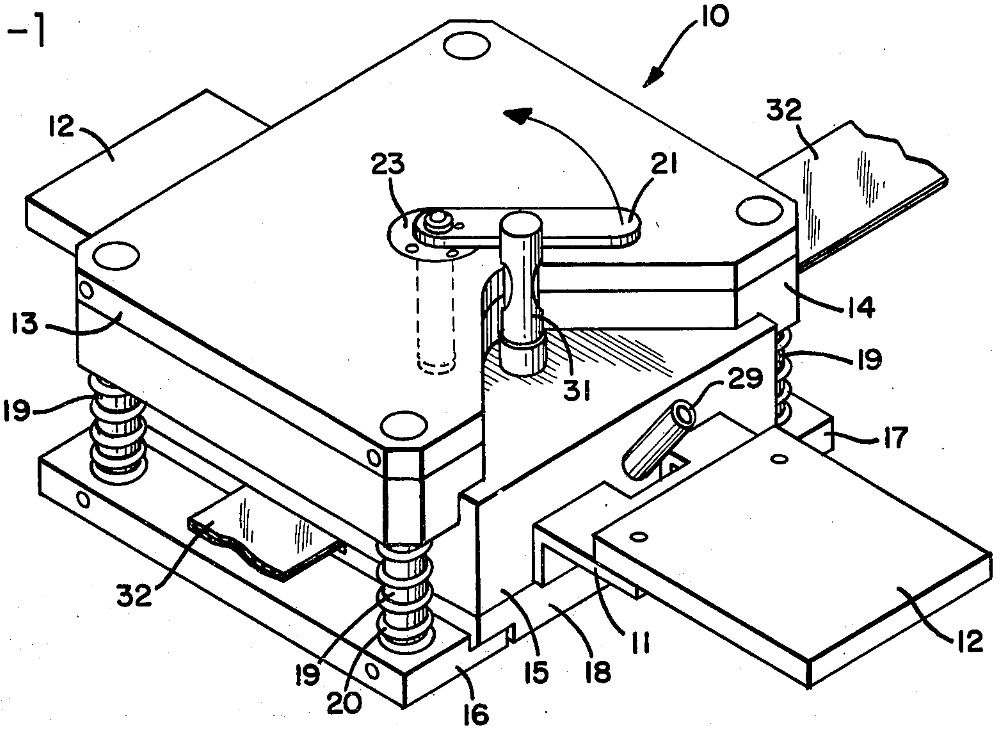
FIG. 1 is a perspective drawing of a jet drop recording head constructed in accordance with this invention.
Figure 2:
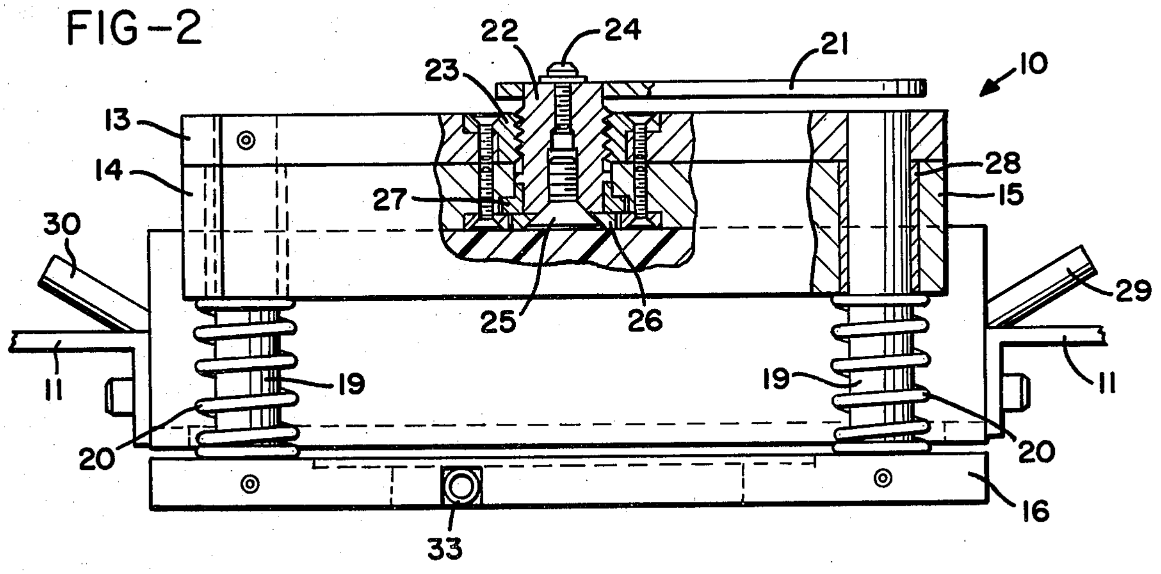
FIG. 2 is a partially cut away side elevation view of the jet drop recording head of FIG. 1.
Figure 3:
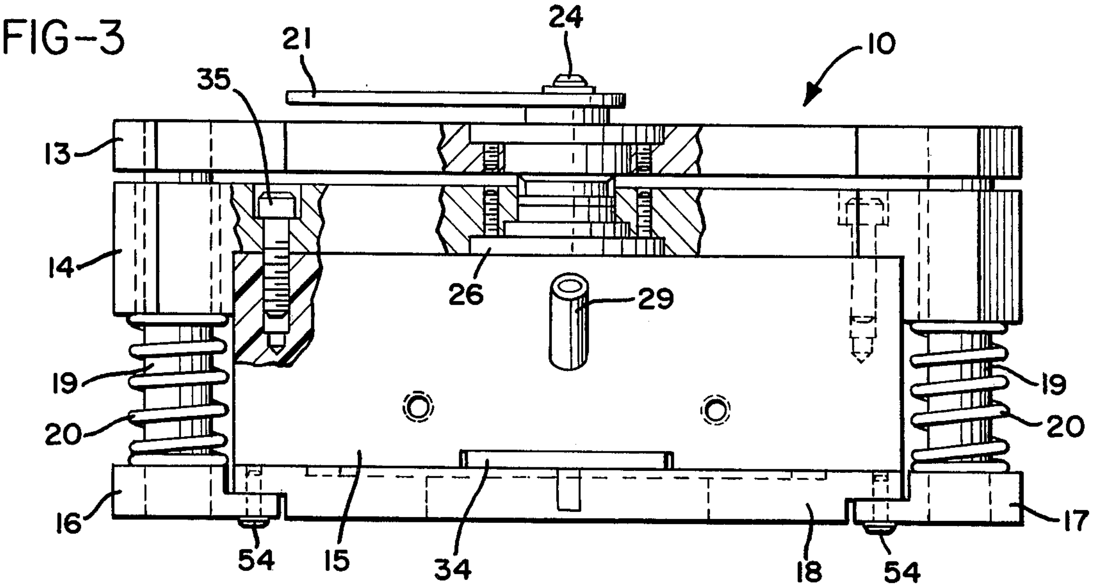
FIG. 3 is a partially cut away front elevation view of the jet drop recording head of FIG. 1.
Figure 4:
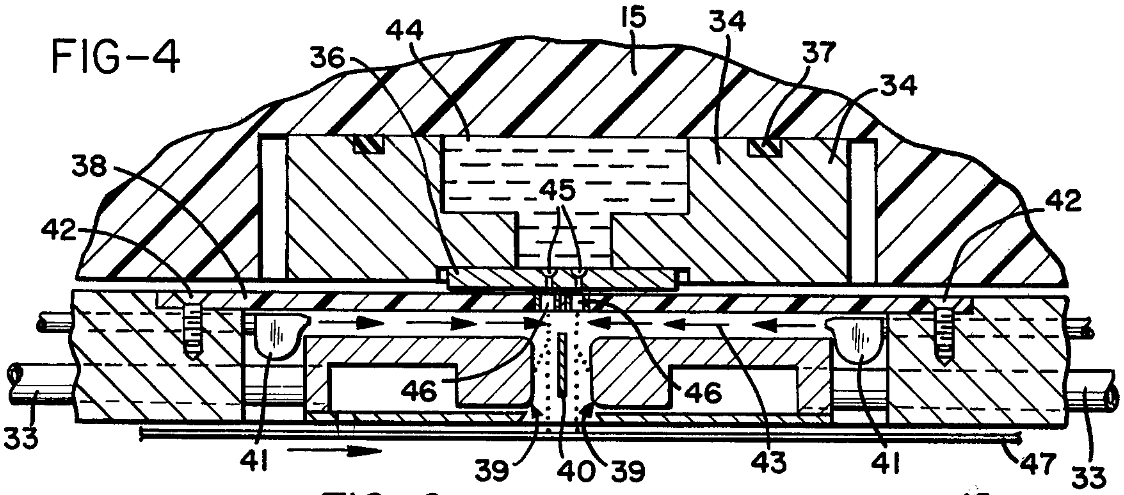
FIG. 4 is a schematic illustration in cross-section of the drop forming and control components utilized in the apparatus of FIG. 1.

The preferred embodiment of this invention utilizes a print head assembly 10 as generally illustrated in FIGS. 1 through 3. Print head assembly 10 includes printing control elements as illustrated schematically in FIG. 4. The printing control elements of FIG. 4 are arranged in a manner generally as described in Mathis U.S. Pat. No. 3,701,998. Thus there is an orifice plate 36 including two rows of orifices 45, which create two rows of drop streams. The drop streams pass through a series of charge rings 46 in a charge plate 38 for selective charging and deflection, all as described in detail in the Mathis patent.

A deflection electrode 40 is positioned between the two rows of drop streams, and a pair of catchers 39 are positioned on opposite sides of the deflection electrode. In operation selected drops are deflected by electrical deflection fields between electrode 40 and catchers 39. The drops so deflected run down the faces of catchers 39 for ingestion therein. Catchers 39 are connected to vacuum lines 33, by means of which catchers 39 are evacuated.

Ink drops which are not deflected and caught by one of the catchers 39 deposit on a moving web of paper 47 to produce printed matter. For printing with more than one row of drop streams as illustrated, it is necessary to utilize a switching delay technique as described in Taylor et al RE28,219.

Still referring to FIG. 4 orifice plate 36 is soldered or otherwise bonded to an orifice plate holder 34, and orifice plate holder 34 is mounted within a manifold block 15 to create a cavity 44 for holding a supply of electrically conductive ink. An O ring 37 seals the interface between orifice plate holder 34 and manifold block 15. Charge plate 38 is vertically moveable, being attached to a moveable mounting plate 18 as by a set of screws 42.

Referring now to FIGS. 1 through 3, it will be seen that mounting plate 18 is secured by means of screws 54 to retaining bars 16 and 17. Retaining bars 16 and 17 are secured to four support posts 19, which in turn are secured to a carrier plate 13. Each of support posts 19 carries a spring 20, and springs 20 are compressed between the retaining bars and a base member 14.

There are a pair of mounting brackets 11 fastened to base member 14, as illustrated in FIG. 1, and to mounting brackets 11 are attached a pair of support plates 12. Support plates 12 are mounted on a frame (not illustrated) so that base member 14 is stationary. Manifold block 15 is secured to base member 14 by screws 35 (FIG. 3), so that manifold block 15, orifice plate holder 34 and orifice plate 36 are likewise stationary.

In order to produce movement of charge plate 38 relative to orifice plate 36 there is provided a lever arm 21. Lever arm 21 is secured to a threaded spindle 22 by means of a screw 24 (FIG. 2). Spindle 22 is threaded into an insert 23, which is fastened to carrier plate 13. There is a retainer 26 attached to the lower end of spindle 22 by a screw 25. Retainer 26 bears against the lower surface of a bearing 27, which in turn is mounted fast within base member 14. Spindle 22 is journaled inside bearing 27, so that rotation of lever arm 21 produces vertical movement of carrier plate 13. Such vertical movement of carrier plate 13 causes vertical sliding movement of support posts 19, which in turn causes motion of charge plate 38 as above described. As shown in FIG. 2, sliding motion of each support post 19 is facilitated by a bearing 28 mounted within base member 14.

Other elements of the print head assembly are printed circuit lead strips 32, an ink supply tube 29, an ink return tube 30, and a stimulation transducer 31. Printed circuit lead strips 32 carry printed circuit leads for connection to charge rings 46. Ink supply tube 29 is connected to cavity 44 for ink resupply. Ink return tube 30 is connected to cavity 44 for ink evacuation after shutdown.

Stimulator 31 includes a piezoelectric transducer, and a rotatable probe as described in Houser U.S. Pat. No. 3,701,476. The probe (not shown) reaches downwardly for contact with orifice plate 36. Stimulation is accomplished by a travelling wave technique as described in Lyon et al U.S. Pat. No. 3,739,393.

Figure 5:
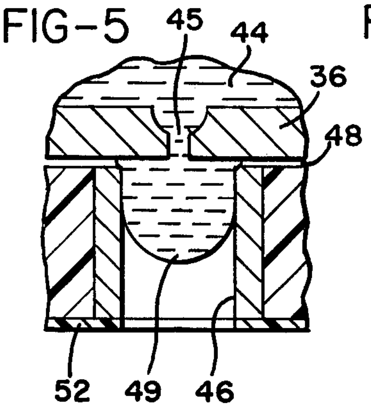
FIG. 5 is an enlarged schematic illustration of an initial phase of jet startup with a charge plate positioned closely against an orifice plate in accordance with this invention.
Figure 6:
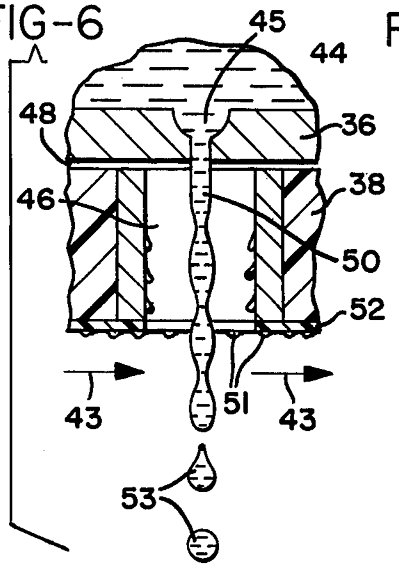
FIG. 6 is a schematic illustration of a jet stream immediately after formation thereof.

For starting up the print head of this invention lever arm 21 is rotated clockwise to cause orifice plate 38 to move upwardly into contact, or near contact, with orifice plate 36. In this position, as shown in FIGS. 5 and 6, there may be a very small gap 48 between orifice plate 36 and charge plate 38. The width of this gap should be in the order of about 0.05 millimeters or less in order to prevent liquid seepage between orifice plate 36 and charge plate 38.

After charge plate 38 has been moved upwardly to the position as shown in FIGS. 5 and 6, the liquid startup sequence is commenced. Preferably the sequence begins by pumping a flush fluid into manifold block 15 for transmission to the orifices 45. The flush fluid may be a mixture of distilled deionized water and denatured alcohol, as described in Stoneburner U.S. Pat. No. 3,891,121. In general ink could be used for initiating startup, but this may result in causing an undesirable residue on the charging electrodes.

As the flushing fluid or ink flows through an orifice 45 it tends to blob outwardly within the confines of its charge ring 46 as shown at 49. Eventually the charge ring becomes filled with liquid, and thereafter a free flowing stream is formed. The blob of ink is carried away by the stream, leaving behind numerous small droplets 51 as illustrated in FIG. 6. These droplets 51 are found inside the charge rings and on the lower surface of the charge plate in areas adjacent the charge rings. Preferably the lower surface of charge plate 38 has a thin coating 52 of material which is non-wettable against the flush fluid. A coating of polytetrafluoroethylene having a thickness in the order of about 0.05 millimeters has been found satisfactory to minimize the accumulation of liquid on the lower surface of charge plate 38. Being electrically insulating, the polytetrafluorethylene will not produce a shorting condition between the charge rings.

Once free flowing liquid streams have been achieved, the stimulating disturbances produced by stimulator 31 cause the streams to break up, producing filaments, such as filament 50, and uniformly sized drops 53. At this time the lower surface of charge plate 38 may be dried by directing a stream of air thereagainst. Two such streams of air may be produced by a pair of manifolds 41 as illustrated in FIG. 4. Manifolds 41 may be connected to a pressurized air supply, thereby creating a flow as indicated by the arrows 43. It has been found that very little flush fluid collects on the lower surface of charge plate 38, and very little drying is required.

Figure 7:
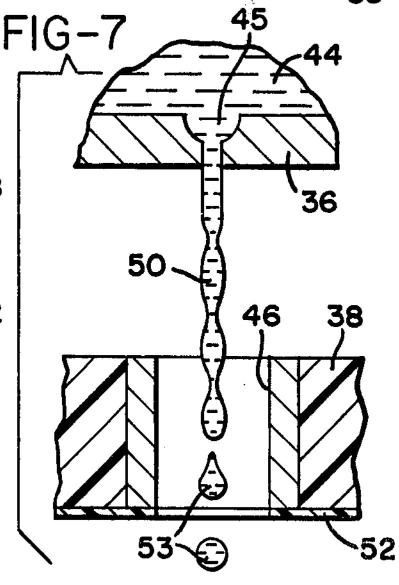
FIG. 7 is a schematic illustration of a jet stream with the charge plate in operating position.

After the lower surface of charge plate 38 has been dried, lever arm 21 is rotated counterclockwise to move charge plate 38 downwardly to the position illustrated in FIG. 7. This is the normal operating position at which the separation between charge plate 38 and orifice plate 36 may be in the order of about 0.25 millimeters or greater. After this separation has been accomplished, it is convenient to discontinue pumping flush fluid into supply tube 29 and to replace the flush fluid with a flow of ink. This sequence is not critical, however, and the switch from flush fluid to ink may be performed with the charge plate in the position illustrated in FIGS. 5 and 6. It is desirable that the above mentioned drying step be completed before ink is introduced into the print head.

As an alternative to convective drying, print head 10 may be mounted for rotation about a horizontal axis. This permits inclining the charge plate upwardly, so that collected flush fluid runs downwardly off the lower surface thereof. Such inclination of the print head does not disturb the jets, which are free flowing and operating in a full catch mode, all drops being charged, deflected and caught. When the coating layer 52 is polytetrafluoroethylene as above described, the charge plate can be satisfactorily cleared of collecting flushing fluid by inclining the print head to an angle in the order of about 30°.

Depending upon the type of print head design, it may be desirable to employ both blowing air and head inclination for clearing collected flush fluid from the lower surface of the charge plate. In any event coating 52 must be electrically insulating in order to avoid creation of an electrical connection between the charge rings.

While the methods and forms of apparatus herein described constitute preferred embodiments of the invention, it is to be understood that the invention is not limited to these precise methods and forms of apparatus, and that changes may be made therein without departing from the scope of the invention.

What is claimed is:

1. In a jet drop recording head comprising a recording liquid supply manifold having an enlarged opening on one side, an orifice plate having a plurality of jet forming orifices and being sealed against said manifold for communication of said orifices with said enlarged opening, and a charge plate positioned in spaced relation to said orifice plate and provided with a plurality of charge ring apertures located in registration with said orifices; the improvement wherein said charge plate is moveable between an operating position as aforesaid and a startup position with the perimeters of said apertures in liquid resisting proximity to said orifice plate and concentric with said orifices.

2. The improvement of claim 1 wherein said recording head is provided with means for carrying a liquid drying airflow across the surface of said charge plate which is remote from said orifice plate.

3. The improvement of claim 1 wherein the surface of said charge plate remote from said orifice plate is covered with a non-wettable coating material.

4. The improvement of claim 3 wherein said coating material is polytetrafluoroethylene and is coated to a thickness in the order of about 0.05 mm.

5. The improvement of claim 3 wherein the distance between said orifice plate and said charge plate is greater than about 0.25 mm for normal operation and less than about 0.05 mm for startup.

6. The improvement of claim 3 wherein said recording head is provided with means for carrying a liquid drying airflow across the surface of said charge plate remote from said orifice plate.

7. A jet recording head comprising:

a recording liquid supply manifold having an enlarged opening on one side, an orifice plate provided with a plurality of jet forming orifices and sealed against said manifold with said orifices in communication with said enlarged opening, an electrically insulative charge plate provided with a series of charge ring apertures arranged for registration with said orifices, said orifices being lined with conductive charge ring defining material and said charge plate being provided with means for electrical connection of the charge rings so defined to a source of charging control signals, and support means for supporting said charge plate moveably from an operating position spaced apart from said orifice plate to a startup position in liquid resisting proximity to said orifice plate, the movement of said charge plate relative to said orifice plate being such as to maintain said charge ring apertures in registration with said orifices.

8. Apparatus according to claim 7 wherein said support means moves said charge plate relative to said orifice plate so as to achieve a separation greater than about 0.25 mm for normal operation and less than about 0.05 mm for startup.

9. Apparatus according to claim 8 further comprising means for producing a liquid drying flow of air across the surface of said charge plate remote from said orifice plate.

10. Apparatus according to claim 9 wherein the surface of said charge plate remote from said orifice plate is covered with a non-wettable coating material.

11. Apparatus according to claim 7 wherein said support means comprises a mounting plate for supporting said charge plate below said orifice plate, a carrier plate positioned on the top side of said head, connection means rigidly connecting said carrier plate to said mounting plate, and motion control means for moving said carrier plate vertically relative to said manifold.

12. Apparatus according to claim 11 wherein said motion control means comprises a threaded spindle, threaded means fixed with respect to said carrier plate for receiving said spindle, retaining means fixed with respect to said manifold for preventing vertical movement of said spindle during rotation thereof, and means for rotating said spindle to cause vertical motion of said carrier plate, said connection means, said mounting plate and said charge plate.

13. Apparatus according to claim 12 wherein said connection means comprises a plurality of support posts extending vertically between said carrier plate and said mounting plate.

14. In a jet drop recording head having a jet forming nozzle and a circular charging electrode spaced apart from said nozzle, the method of starting a flow of liquid through said nozzle comprising the steps of:

placing said electrode in sufficiently close proximity to said nozzle as to resist entry of said liquid between the adjacent surfaces thereof, thereafter introducing said liquid into said recording head and forcing it through said nozzle and said electrode to form a liquid jet, and thereafter retracting said electrode to an operating position spaced apart from said nozzle and surrounding said jet.

15. In a jet drop recording head having a jet forming nozzle and a circular charging electrode spaced apart from said nozzle, the method of starting a flow of recording liquid through said nozzle comprising the steps of:

placing said electrode in liquid resisting proximity to said nozzle, after aforesaid placement introducing a flushing liquid into said recording head and forcing it through said nozzle and electrode to form a liquid jet, introducing recording liquid into said recording head to replace said flushing liquid in said jet, and retracting said electrode to an operating position spaced apart from said nozzle and surrounding said jet.

16. A method according to claim 15 wherein said electrode is placed at a distance less than about 0.05 mm from the surface of said nozzle to accommodate formation of said liquid jet.

17. A method according to claim 16 wherein said electrode is retracted to an operating position spaced apart from said nozzle a distance greater than about 0.25 mm.

18. In a jet drop recording head having an orifice plate provided with a multiplicity of jet forming orifices and a charge plate provided with a multiplicity of charge rings in registration with said orifices, the method of starting a flow of recording liquid through said orifices comprising the steps of:

placing said charge plate in liquid resisting proximity to said orifice plate, after aforesaid placement introducing a flushing liquid into said recording head and forcing it through said orifices and charge rings to form a multiplicity of liquid jets, introducing a recording liquid into said recording head to replace said flushing liquid in said jets, and retracting said charge plate to an operating position spaced apart from said orifice plate.

19. A method according to claim 18 and including the step of blowing air across the surface of said charge plate remote from said orifice plate for drying of flushing liquid collected thereon, said air blowing step being performed while flushing liquid is flowing through said nozzle with the charge plate in said liquid resisting position.

20. A method according to claim 18 and including the step of tilting said head to drain collected liquid from the lower surface of said charge plate.

21. A method according to claim 20 wherein said head is tilted to an angle in the order of about 30 degrees from the horizontal.

22. A method according to claim 20 and including the step of blowing a drying flow of air across the lower surface of said charge plate.

* * * * *